(12) United States Patent
Sajassi et al.

(10) Patent No.: US 7,715,310 B1
(45) Date of Patent: May 11, 2010

(54) L2VPN REDUNDANCY WITH ETHERNET ACCESS DOMAIN

(75) Inventors: Ali Sajassi, Concord, CA (US); Eric Voit, Bethesda, MD (US)

(73) Assignee: Cisco Technology, Inc., San Jose ( * ) Notice: Subject to any disclaimer, the term of this patent is extended or adjusted under 35 U.S.C. 154(b) by 940 days.

(21) Appl. No.: 10/857,716

(22) Filed: May 28, 2004

(51) Int. Cl.
*H04L 1/00* (2006.01)
*H04L 12/26* (2006.01)
*G06F 15/173* (2006.01)

(52) U.S. Cl. .................................. 370/219; 709/239
(58) Field of Classification Search ................. 370/218, 370/219, 220
See application file for complete search history.

(56) References Cited

U.S. PATENT DOCUMENTS

| | | | |
|---|---|---|---|
| 5,331,637 A | 7/1994 | Francis et al. | |
| 5,818,842 A | 10/1998 | Burwell et al. | |
| 5,848,227 A * | 12/1998 | Sheu ............................. | 714/4 |
| 6,055,364 A | 4/2000 | Speakman et al. | |
| 6,073,176 A | 6/2000 | Baindur et al. | |
| 6,078,590 A | 6/2000 | Farinacci et al. | |
| 6,219,739 B1 * | 4/2001 | Dutt et al. .................... | 710/311 |
| 6,301,244 B1 | 10/2001 | Huang et al. | |
| 6,308,282 B1 | 10/2001 | Huang | |
| 6,373,838 B1 | 4/2002 | Law et al. | |
| 6,424,657 B1 | 7/2002 | Voit et al. | |
| 6,430,621 B1 | 8/2002 | Srikanth et al. | |
| 6,484,209 B1 | 11/2002 | Momirov | |
| 6,502,140 B1 | 12/2002 | Boivie | |
| 6,611,869 B1 | 8/2003 | Eschelbeck et al. | |
| 6,667,982 B2 | 12/2003 | Christie et al. | |
| 6,668,282 B1 | 12/2003 | Booth, III et al. | |
| 6,697,339 B1 * | 2/2004 | Jain ........................... | 370/256 |

(Continued)

FOREIGN PATENT DOCUMENTS

WO     WO 2007/031002 A     3/2007

(Continued)

OTHER PUBLICATIONS

Do-Wire Edge-To Edge (PWE3) Working Group, Simon Delord, Uecomm; Philippe Niger, France Telecom; Yuichi Ikejiri, Yuichiro Wada, NTT Debor.

(Continued)

*Primary Examiner*—Gregory B Sefcheck
(74) *Attorney, Agent, or Firm*—The Law Offices of Bradley J. Bereznak

(57) ABSTRACT

Redundancy for Virtual Private Network (VPN) service with an Ethernet access network is provided by a full-mesh of dedicated pseudowires connected among the network-facing provider edge (n-PE) devices, each of which is associated with the same Ethernet access network. A provider Bridge Protocol Data Unit (BPDU) generated by a provider bridge node in the Ethernet access network and received at an input interface of one n-PE device is relayed (without being processed) to all other n-PEs associated with that access network over the full-mesh of dedicated pseudowires. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

23 Claims, 5 Drawing Sheets

U.S. PATENT DOCUMENTS

| | | | |
|---|---|---|---|
| 6,732,189 B1 | 5/2004 | Novaes | |
| 6,757,286 B1 | 6/2004 | Stone | |
| 6,763,469 B1 | 7/2004 | Daniely | |
| 6,785,232 B1 | 8/2004 | Kotser et al. | |
| 6,785,265 B2 | 8/2004 | White et al. | |
| 6,789,121 B2 | 9/2004 | Lamberton et al. | |
| 6,798,775 B1 | 9/2004 | Bordonaro | |
| 6,801,533 B1 | 10/2004 | Barkley | |
| 6,813,268 B1 | 11/2004 | Kalkunte et al. | |
| 6,826,698 B1 | 11/2004 | Minkin et al. | |
| 6,829,252 B1 | 12/2004 | Lewin et al. | |
| 6,839,348 B2 | 1/2005 | Tang et al. | |
| 6,850,521 B1 | 2/2005 | Kadambi et al. | |
| 6,850,542 B2 | 2/2005 | Tzeng | |
| 6,852,542 B2 | 2/2005 | Mandel et al. | |
| 6,882,643 B1 | 4/2005 | Mauger et al. | |
| 6,892,309 B2 | 5/2005 | Richmond et al. | |
| 6,954,436 B1 | 10/2005 | Yip | |
| 7,009,983 B2 | 3/2006 | Mancour | |
| 7,092,389 B2 | 8/2006 | Chase et al. | |
| 7,113,512 B1 | 9/2006 | Holmgren et al. | |
| 7,116,665 B2 | 10/2006 | Balay et al. | |
| 7,173,934 B2 * | 2/2007 | Lapuh et al. | 370/392 |
| 7,269,132 B1 * | 9/2007 | Casey et al. | 370/219 |
| 7,277,936 B2 | 10/2007 | Frietsch | |
| 7,310,342 B2 | 12/2007 | Rouleau | |
| 7,345,991 B1 | 3/2008 | Shabtay et al. | |
| 7,408,936 B2 | 8/2008 | Ge et al. | |
| 7,466,703 B1 | 12/2008 | Arunachalam et al. | |
| 2002/0032780 A1 | 3/2002 | Moore et al. | |
| 2002/0087721 A1 | 7/2002 | Sato et al. | |
| 2002/0156612 A1 | 10/2002 | Schulter et al. | |
| 2002/0196795 A1 * | 12/2002 | Higashiyama | 370/401 |
| 2003/0012183 A1 | 1/2003 | Butler | |
| 2003/0036375 A1 | 2/2003 | Chen et al. | |
| 2003/0101243 A1 | 5/2003 | Donahue et al. | |
| 2003/0110268 A1 | 6/2003 | Kermarec et al. | |
| 2003/0112781 A1 | 6/2003 | Kermode et al. | |
| 2003/0142674 A1 | 7/2003 | Casey | |
| 2003/0154259 A1 | 8/2003 | Lamberton et al. | |
| 2003/0177221 A1 | 9/2003 | Ould-Brahim et al. | |
| 2004/0095940 A1 | 5/2004 | Yuan et al. | |
| 2004/0102182 A1 | 5/2004 | Reith et al. | |
| 2004/0125809 A1 | 7/2004 | Jeng | |
| 2004/0141501 A1 | 7/2004 | Adams et al. | |
| 2004/0151180 A1 | 8/2004 | Hu et al. | |
| 2004/0158735 A1 | 8/2004 | Roese | |
| 2004/0165525 A1 * | 8/2004 | Burak | 370/228 |
| 2004/0165600 A1 | 8/2004 | Lee | |
| 2004/0172559 A1 | 9/2004 | Luo et al. | |
| 2004/0228291 A1 | 11/2004 | Huslak et al. | |
| 2004/0233891 A1 * | 11/2004 | Regan et al. | 370/351 |
| 2004/0264364 A1 | 12/2004 | Sato | |
| 2005/0007951 A1 * | 1/2005 | Lapuh et al. | 370/225 |
| 2005/0025143 A1 | 2/2005 | Chen et al. | |
| 2005/0030975 A1 | 2/2005 | Wright et al. | |
| 2005/0044265 A1 | 2/2005 | Vinel et al. | |
| 2005/0063397 A1 | 3/2005 | Wu et al. | |
| 2005/0068972 A1 | 3/2005 | Burns et al. | |
| 2005/0089047 A1 | 4/2005 | Ould-Brahim et al. | |
| 2005/0099949 A1 | 5/2005 | Mohan et al. | |
| 2005/0152370 A1 | 7/2005 | Meehan et al. | |
| 2005/0157664 A1 | 7/2005 | Baum et al. | |
| 2005/0157751 A1 | 7/2005 | Rabie et al. | |
| 2005/0163049 A1 | 7/2005 | Yazaki et al. | |
| 2005/0175022 A1 | 8/2005 | Nishimura et al. | |
| 2005/0190773 A1 | 9/2005 | Yang et al. | |
| 2005/0239445 A1 | 10/2005 | Karaogguz et al. | |
| 2005/0249124 A1 | 11/2005 | Elie-Dit-Cosaque et al. | |
| 2005/0286503 A1 | 12/2005 | Oda et al. | |
| 2006/0007867 A1 | 1/2006 | Elie-Dit-Cosaque et al. | |
| 2006/0092847 A1 | 5/2006 | Mohan et al. | |
| 2006/0098607 A1 | 5/2006 | Zeng | |
| 2006/0182037 A1 | 8/2006 | Chen et al. | |
| 2006/0248277 A1 | 11/2006 | Pande | |
| 2006/0285500 A1 | 12/2006 | Booth | |
| 2006/0285501 A1 | 12/2006 | Damm | |

FOREIGN PATENT DOCUMENTS

| | | |
|---|---|---|
| WO | WO 2008/089370 | 7/2008 |

OTHER PUBLICATIONS

"PWE3 Applications & OSM Scenarios; draft-delord-pwe3-oam-applications 02.txt" Standard-Working-Draft, Internet Engineering Task Force, IEFT, CH, No. 2, Oct. 1, 2005.

XP015042128 ISSN: 0000-0004 abstract p. 10, paragraph 3 Section 3.1.1.1. on pp. 12-13; http://ftp.ist.utl.pt/pub/drafts/draft-delord-pwe3-oam-applications-02.txt.

Blunk et al. Draft RFC 2284-Extensible Authentication Protocol EAP, Feb. 2004; http://tools.ietf.org/html/draft-ietf-eap-rfc2284bis-09.

Light Reading, Inc., Distributed-Edge Artecture, Nov. 25, 2003; http://www.lightreading.com/document.asp?site=lightreading&doc_id=43679&page_number=4.

Landron, Use of the IEEE Assigned Type Field with IEEE std 802.3, 1998 Edition Local and Metropolian Area Networks, Apr. 16, 2004, http://standards.ieee.org/regauth/ethertype/type-tut.html.

Marc Lasserre et al.,"Virtual Private LAN Services over MPLS", Mar. 2003, Internet Draft Document, pp. 4-22; http://tools.ietf.org/html/draft-lasserre-vkompella-ppvpn-vpls-04.

Lahti "Quality of Service in the Poin-to-Point Protocol over Ethernet" in: Google Scholar, (on line, <URL:http://www.e.kth.se/~e95_pla/exjobb/doc/Lahti_Thesis_QoS_PPPoE.pdf>) Oct. 1, 2000.

Wolfe, [dhcwg] Publication of draft-droms-agentopt-8021x-00.txt, Nov. 22, 2001, IETF.

Cisco, Delivering Multicast Vidoe over Asymmetric Digital Subscriber Line, 1999, Cisco.

Flannagan et al., Cisco Catalyst QoS; Quality of Service in Campus Networks, Jun. 6, 2003, Cisco Press, chapter 8, section 4.

* cited by examiner

L2VPN REDUNDANCY WITH ETHERNET ACCESS DOMAIN

FIELD OF THE INVENTION

The present invention relates generally to digital computer network technology; more particularly, to methods and apparatus for providing metro Ethernet services.

BACKGROUND OF THE INVENTION

Many enterprises are changing their business processes using advanced information technology (IT) applications to achieve enhanced productivity and operational efficiencies. These advanced applications tend to place increasing importance on peer-to-peer data communications, as compared to traditional client-server data communications. As a result, the underlying network architecture to support these applications is evolving to better accommodate this new model.

The performance of many peer-to-peer applications benefit from being implemented over service provider networks that support multipoint network services. A multipoint network service is one that allows each customer edge (CE) end point or node to communicate directly and independently with all other CE nodes. Ethernet switched campus networks are an example of a multipoint service architecture. The multipoint network service contrasts with the hub-and-spoke network service, where the end customer designates one CE node to the hub that multiplexes multiple point-to-point services over a single User-Network Interface (UNI) to reach multiple "spoke" CE nodes. In a hub-and-spoke network architecture, each spoke can reach any other spoke only by communicating through the hub. Traditional network service offering to the end customers via wide area networks (WANs) such as Frame Relay (FR) and asynchronous transfer mode (ATM) networks are based on a hub-and-spoke service architecture.

Virtual Private Network (VPN) services provide secure network connections between different locations. A company, for example, can use a VPN to provide secure connections between geographically dispersed sites that need to access the corporate network. There are three types of VPN that are classified by the network layer used to establish the connection between the customer and provider network. Layer 1 VPNs are simple point-to-point connections such as leased lines, ISDN links, and dial-up connections. In a Layer 2 VPN (L2VPN) the provider delivers Layer 2 circuits to the customer (one for each site) and provides switching of the customer data. Customers map their Layer 3 routing to the circuit mesh, with customer routes being transparent to the provider. Many traditional L2VPNs are based on Frame Relay or ATM packet technologies. In a Layer 3 VPN (L3VPN) the provider router participates in the customer's Layer 3 routing. That is, the CE routers peer only with attached PEs, advertise their routes to the provider, and the provider router manages the VPN-specific routing tables, as well as distributing routes to remote sites. In a Layer 3 Internet Protocol (IP) VPN, customer sites are connected via IP routers that can communicate privately over a shared backbone as if they are using their own private network. Multi-protocol label switching (MPLS) Border Gateway Protocol (BGP) networks are one type of L3VPN solution. An example of an IP-based Virtual Private Network is disclosed in U.S. Pat. No. 6,693,878. U.S. Pat. No. 6,665,273 describes a MPLS system with a network device for traffic engineering.

Virtual Private LAN Service (VPLS) has recently generated interest with enterprises and service providers as it offers multipoint Ethernet LAN services, often referred to as Transparent LAN Service (TLS), over MPLS networks. VPLS is an architecture that delivers a Layer 2 multipoint VPN service that in all respects emulates an Ethernet LAN across a wide metropolitan geographic area. All services in a VPLS appear to be on the same LAN, regardless of location. In other words, with VPLS, customers can communicate as if they were connected via a private Ethernet segment, i.e., multipoint Ethernet LAN services. VPLS thus supports the connection of multiple sites in a single bridged domain over a managed IP/MPLS network.

FIG. 1 illustrates an example of a basic VPLS architecture with an IP or MPLS service provider network core. The customer sites (i.e., CE devices) are connected to the service provider network at a PE device. Each PE-CE pair is shown connected by an Attachment Circuit (AC). An AC is the customer connection to a service provider network; that is, the connection between a CE and its associated PE. An AC may be a physical port, or a virtual port, and may be any transport technology, i.e., Frame Relay, ATM, Ethernet VLAN, etc. In the context of a VPLS, an AC is typically an Ethernet port. In the example of FIG. 1, each PE includes a Virtual Switch Instance (VSI) that emulates an Ethernet bridge (i.e., switch) function in terms of MAC address learning and forwarding in order to facilitate the provision of a multi-point L2VPN. A pseudowire (PW) is shown connecting every two VSIs. A PW is a virtual connection that is bi-directional in nature and, in this example, consists of a pair of unidirectional MPLS Virtual Circuits (VCs).

Conceptually in context of the VPLS service, a PW can be thought of as point-to-point virtual link for each offered service between a pair of VSIs. Therefore, if each VSI can be thought of as a virtual Ethernet switch for a given customer service instance, then each PW can be thought of as a virtual link connecting these virtual switches to each other for that service instance.

Another type of provider provisioned VPN architecture that uses PWs is the Virtual Private Wire Service (VPWS). VPWS is a Layer 2 service that provides point-to-point connectivity (e.g., Frame Relay, ATM, point-to-point Ethernet) and can be used to create port-based or VLAN-based Ethernet private lines across a MPLS-enabled IP network. Conceptually, in the context of the VPWS service, a PW can be thought of as a point-to-point virtual link connecting two customer ACs. After a PW is setup between a pair of PEs, frames received by one PE from an AC are encapsulated and sent over the PW to the remote PE, where native frames are reconstructed and forwarded to the other CE. All PEs in the SP network are connected together with a set of tunnels, with each tunnel carrying multiple PWs. Depending on the number of customer sites and the topology for connecting these sites, the number of PWs setup for a given customer can range from two, for a customer with only two sites, to many PWs for a customer who has locations connected to every PE.

For an Ethernet network to function properly, only one active path can exist between any two nodes. To provide path redundancy and prevent undesirable loops in the network topology caused by multiple active paths, Ethernet networks typically employ Spanning Tree Protocol (STP), or some variant of STP, e.g., MSTP or RSTP. (For purposes of the present application, STP and its variants are generically denoted by the acronym "xSTP".) Switches in a network running STP gather information about other switches in the network through an exchange of data messages called Bridge Protocol Data Units (BPDUs). BPDUs contain information about the transmitting switch and its ports, including its switch and port Media Access Control (MAC) addresses and priorities. The exchange of BPDU messages results in the election of a root bridge on the network, and computation of the best path from each switch to the root switch. To provide path redundancy, STP defines a tree from the root that spans all of the switches in the network, with certain redundant paths being forced into a standby (i.e., blocked) state. If a particular network segment becomes unreachable the STP algorithm reconfigures the tree topology and re-establishes the link by activating an appropriate standby path. Examples of networks that run STP are disclosed in U.S. Pat. Nos. 6,519,231, 6,188,694 and 6,304,575.

A redundancy mechanism for Virtual Private LAN Service with Ethernet access network is described in Section 11.2 of the Internet Engineering Task Force (IETF) document draft-ietf-l2vpn-vpls-ldp-01.txt. The redundancy mechanism described in that draft leverages the use of xSTP on the Ethernet bridges in the access network as well on the PEs to provide a failure recovery mechanism for link and node failures. According to this approach, each network-facing PE (n-PE) runs xSTP such that each BPDU packet is terminated by the receiving n-PE and the information in the BPDU packet is processed by the n-PE. The n-PE then originates a new BPDU packet using the newly processed information. The main drawback of this mechanism is that it requires every node in the Ethernet access network, including n-PE devices, to execute the spanning-tree protocol. However, certain platforms (e.g., with router-based platforms) utilize n-PE devices that are not equipped to run xSTP protocols. These platforms would require costly xSTP-related software development in order to run xSTP protocols.

Thus, there is a need for alternative methods and apparatus that achieve redundancy functionality for VPLS services with Ethernet access networks, while obviating the need to run xSTP protocols on the n-PEs.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

A method and apparatus for achieving L2VPN redundancy with an Ethernet access domain without the need for running xSTP protocols is described. In the following description specific details are set forth, such as device types, protocols, configurations, etc., in order to provide a thorough understanding of the present invention. However, persons having ordinary skill in the networking arts will appreciate that these specific details may not be needed to practice the present invention.

A computer network is a geographically distributed collection of interconnected subnetworks for transporting data between nodes, such as intermediate nodes and end nodes. A local area network (LAN) is an example of such a subnetwork; a plurality of LANs may be further interconnected by an intermediate network node, such as a router or switch, to extend the effective "size" of the computer network and increase the number of communicating nodes. Examples of the end nodes may include servers and personal computers. The nodes typically communicate by exchanging discrete frames or packets of data according to predefined protocols. In this context, a protocol consists of a set of rules defining how the nodes interact with each other.

Each node typically comprises a number of basic subsystems including a processor, a main memory and an input/output (I/O) subsystem. Data is transferred between the main memory ("system memory") and processor subsystem over a memory bus, and between the processor and I/O subsystems over a system bus. Examples of the system bus may include the conventional lightning data transport (or hyper transport) bus and the conventional peripheral component [computer] interconnect (PCI) bus. The processor subsystem may comprise a single-chip processor and system controller device that incorporates a set of functions including a system memory controller, support for one or more system buses and direct memory access (DMA) engines. In general, the single-chip device is designed for general-purpose use and is not heavily optimized for networking applications.

In a typical networking application, packets are received from a framer, such as an Ethernet media access control (MAC) controller, of the I/O subsystem attached to the system bus. A DMA engine in the MAC controller is provided a list of addresses (e.g., in the form of a descriptor ring in a system memory) for buffers it may access in the system memory. As each packet is received at the MAC controller, the DMA engine obtains ownership of ("masters") the system bus to access a next descriptor ring to obtain a next buffer address in the system memory at which it may, e.g., store ("write") data contained in the packet. The DMA engine may need to issue many write operations over the system bus to transfer all of the packet data.

Figure 1:
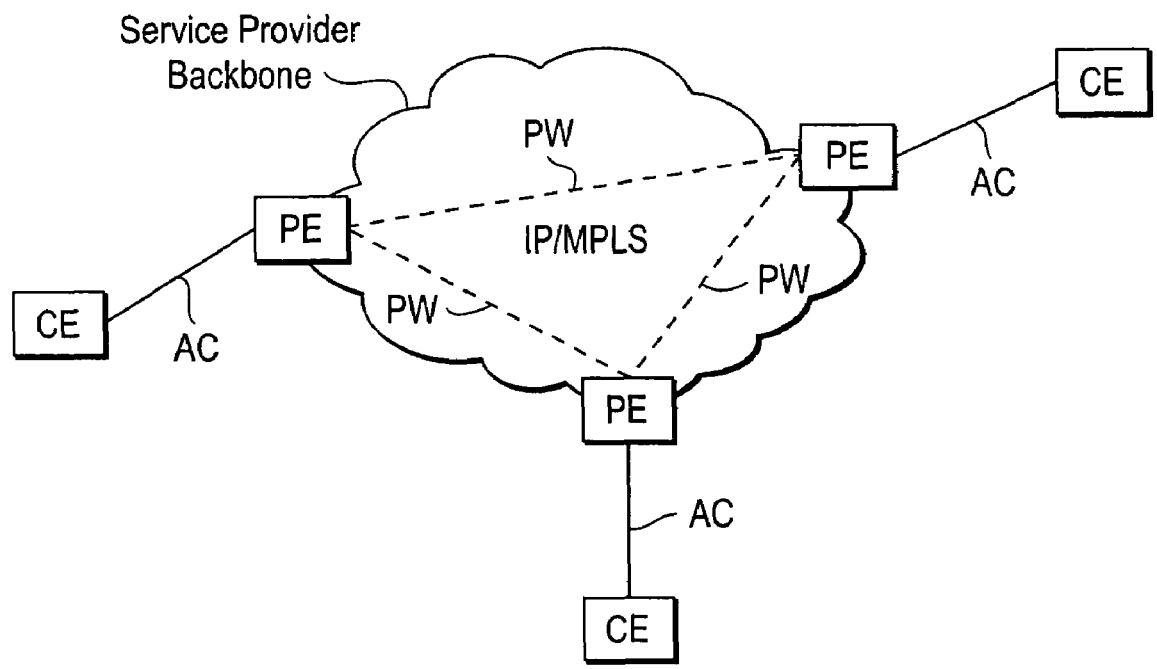
FIG. 1 is an example of a typical prior art VPLS system.
Figure 2:
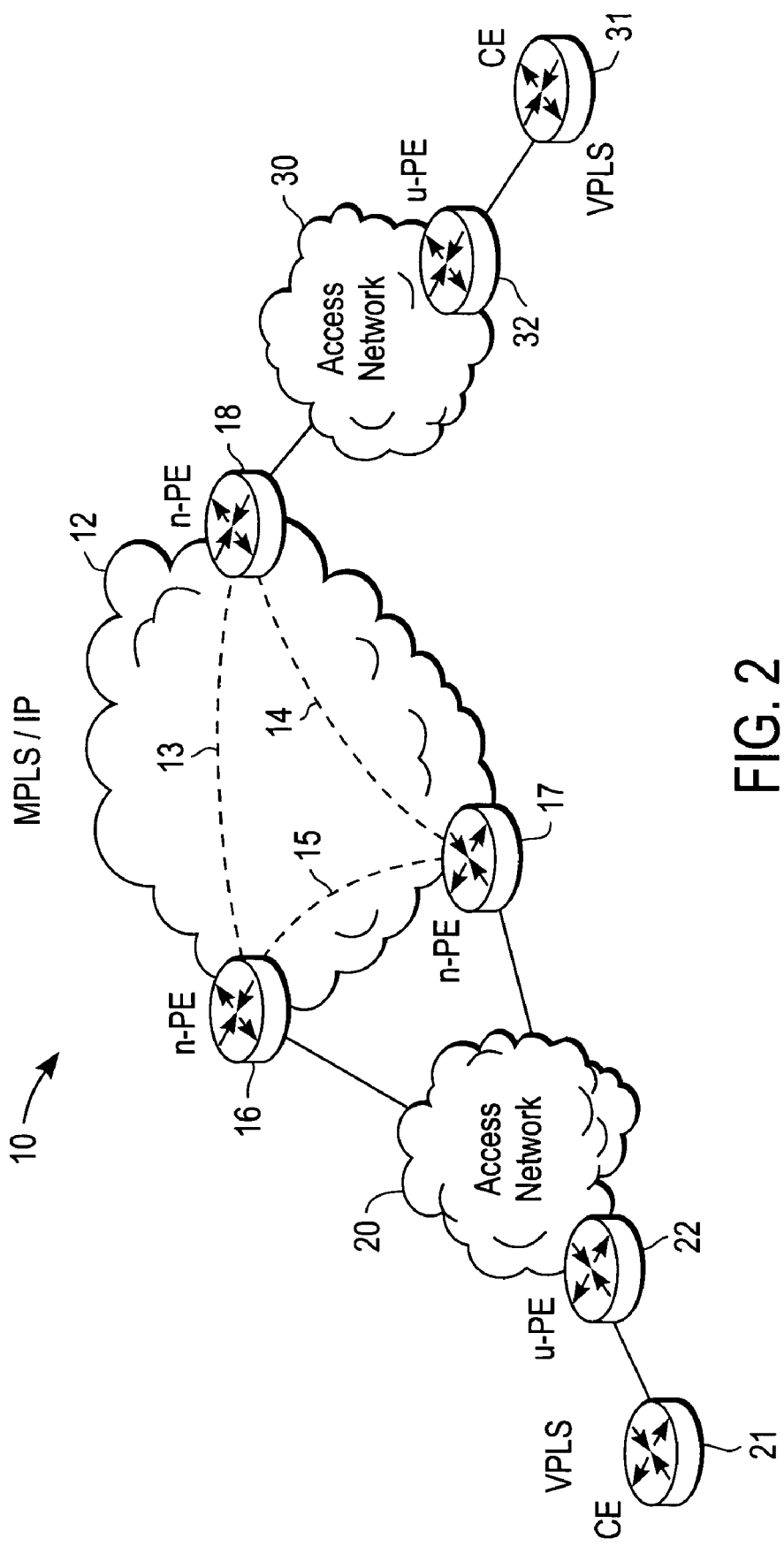
FIG. 2 illustrates an exemplary VPLS system with a MPLS/IP core network and separate access networks in accordance with one embodiment of the present invention.

With reference now to FIG. 2, there is shown an exemplary system 10 providing VPLS service to a customer having two sites/CEs in accordance with one embodiment of the present invention. A Service Provider (SP) core MPLS/IP network 12 is shown including three network-facing provider edge (n-PE) devices 16-18, which act as a gateway between the MPLS/IP core and edge domain. Although not explicitly shown in FIG. 2, MPLS/IP network 12 may include a plurality of ordinary provider (P) devices that act purely as label-switching devices that can swap an incoming label with an outgoing label at very high speed.

The edge domain in system 10 comprises a pair of Ethernet access networks 20 and 30. Access network 20, for example, is shown connected to n-PE devices 16 and 17, whereas access network 30 is shown connected to n-PE device 18 of the MPLS/IP core 12. Each of the access networks 20 & 30 includes respective user-facing provider edge (u-PE) devices 22 & 32, which are used to connect respective customer edge (CE) devices 21 & 31 to the service.

A full mesh of pseudowires (PWs) comprising PWs 13-15 is formed between Virtual Switch Instances (VSIs) associated with a given customer service instance in n-PEs 16-18. Each VSI functions like a logical Ethernet switch or bridge for a given customer service instance with PWs 13-15 providing a mechanism for packet forwarding between a pair of VSIs from one n-PE device to another n-PE device over the network. Thus, PWs 13-15 are used for transport of customer data packet traffic across the MPLS/IP core, thereby interconnecting access networks 20 and 30.

It is appreciated that each individual PW has a set of unique attributes that are specific to that PW only. As the attributes are inherently point-to-point in nature, signaling of these attributes may be performed using a peer-to-peer protocol such as targeted Label Distribution Protocol (LDP).

Figure 3:
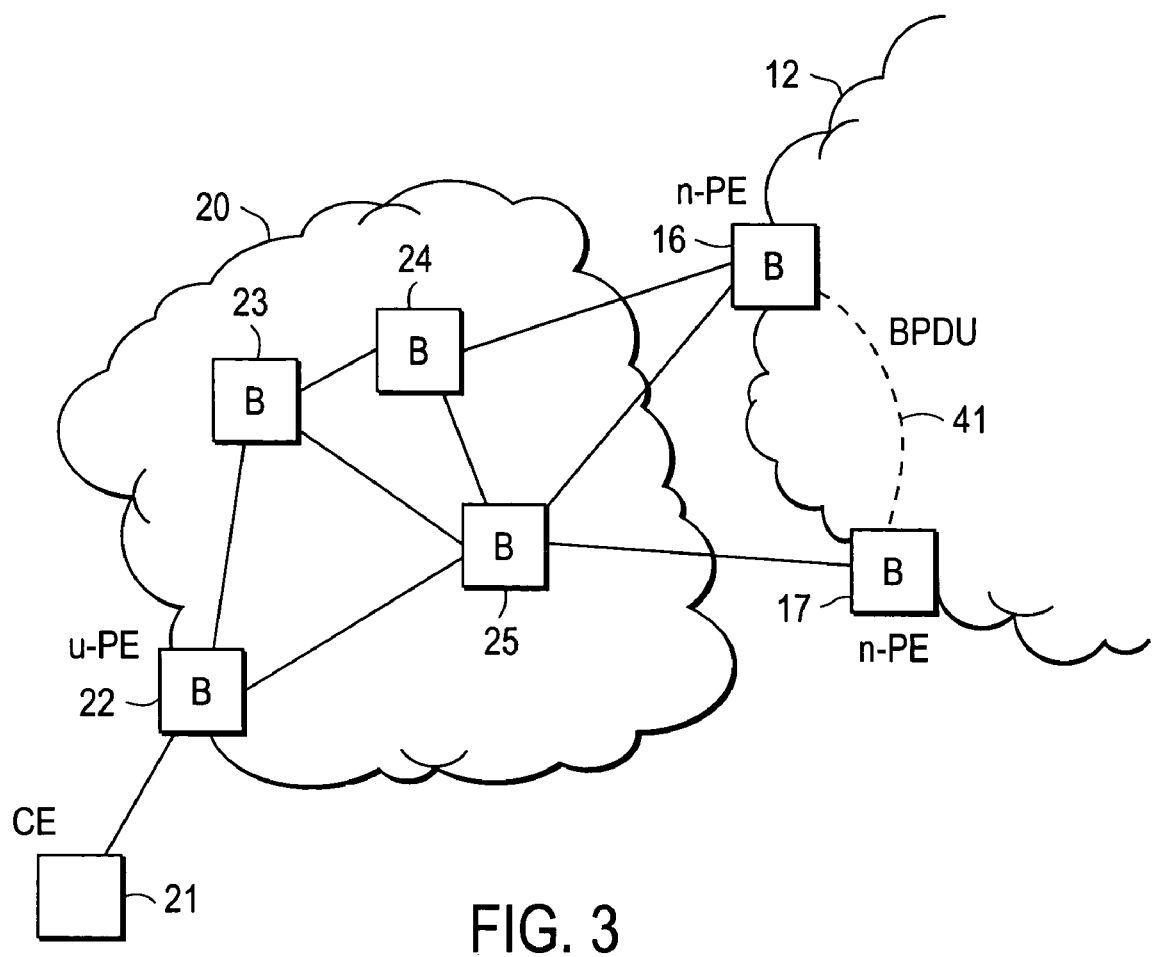
FIG. 3 is an expanded view of the access network of the VPLS system shown in FIG. 2.

With reference now to FIG. 3, a more detailed illustration of the left-hand portion of system 10 is shown with Ethernet access network 20 including a set of Intermediate Provider Bridges 23-25 interconnected with u-PE device 22 and n-PE devices 16 & 17. Bridges 23-25 are also frequently referred to as provider edge aggregation (Agg-PE) devices. Each of Agg-PE devices 23-25 is an Ethernet switch that functions to aggregates one or more u-PE devices for onward connection to one or more n-PE devices. In FIG. 3, for example, Agg-PE devices 23-25 are shown connecting u-PE device 22 with n-PE devices 16 & 17. Note that each of the devices 16, 17 and 22-25 in FIG. 3 is represented as a box with the letter "B" inside to identify these devices as having bridge functionality.

As can be seen, switches 24 & 25 are both shown connected with n-PE device 16. (In the context of the present application, the terms "bridge" and "switch" are considered synonymous.) Switch 25 has an additional connection with n-PE device 17, which provides a redundant connection with access network 20 in the event that n-PE device 16 (or its connection) fails.

According to the present invention, Ethernet access network 20 operates independent of access network 30, with bridges 23-25 running xSTP protocol so as to prevent loops within the access network. A dedicated PW 41 (i.e., VPLS instance) is established between the redundant n-PE devices 16 & 17 for the purpose of facilitating provider edge BPDU traffic. That is, each n-PE device 16 & 17 has a dedicated VSI connected to PW 41 for accommodating BPDU traffic. It should be understood that the purpose of PW 41 is not for transport of customer data packets or customer BPDU packets; rather, PW 41 is associated with a single island or access network for the purpose of passing provider BPDU traffic between the n-PE devices connected to access network 20 (i.e., n-PEs 16 & 17). PW 41 is thus dedicated to carrying BPDUs that are generated by the Provider Bridges (i.e., 24 & 25) directly connected to the n-PEs 16 & 17.

Instead of terminating received BPDUs, processing the information contained in the packet, and generating a new BPDU, n-PE devices 16 & 17 associated with Ethernet access network 20 relay BPDU frames received at their input interface to their output interface for transport across PW 41. In other words, n-PE device 16 simply relays frames it receives from Agg-PE devices 24 & 25 to n-PE device 17 without processing the BPDU frames (e.g., without terminating, processing, and originating BPDU frames). Device 17 functions in the same manner, i.e., it relays received BPDUs to n-PE device 16 without any processing of the frames. Practitioners in the networking arts will appreciate that relay/loopback of the BPDUs in this manner obviates the need for running xSTP protocol on n-PE devices 16 & 17.

Figure 4:
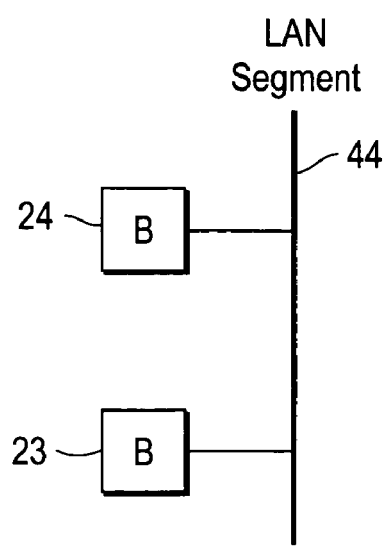
FIG. 4 illustrates an equivalent network connection for the n-PE devices shown in the portion of the VPLS system of FIG. 3.

The result of relaying BPDU frames received by n-PE devices 16 & 17 over their trunks in the dedicated BPDU VPLS instance (i.e., PW 41) is that for all the access network bridges attached to n-PE devices 16 & 17 (i.e., bridges 24 & 25) the core network, as well as n-PEs 16 & 17, appear as a single LAN segment. In other words, the BPDU relay function in conjunction with the BPDU VPLS instance described above presents n-PE devices 16 & 17 and MPLS/IP core network 12 as a single LAN segment 44 to the Agg-PE devices 24 & 25 connected to n-PE devices 16 & 17. To put it another way, all of the Agg-PE devices connected to the n-PEs in a single access domain (e.g., single Ethernet access network or island) operate as if they were connected to a single LAN segment. This situation is illustrated in FIG. 4, where core network 12 and n-PEs 16 & 17 appear as a single LAN segment 44 to bridge devices 24 & 25.

Persons of skill in the art will further appreciate that when bridges are connect to a LAN segment through one or more links, then all of the xSTP protocols relating to link or node failures over the LAN segment are applicable based on IEEE 802.1 standards. This means, for example, that if the connection between access network 20 and n-PE 16 fails, customer data packet traffic is re-routed through the redundant n-PE device, i.e., n-PE 17. The present invention thus provides for link/node failure recovery for an Ethernet access network of an L2VPN without the need to run xSTP protocols on the associated n-PE devices.

The approach of the present invention also offers the flexibility of supporting different L2VPN types (e.g., VPWS and VPLS) as well as any topology on the access network, without requiring that the associated n-PE devices run xSTP protocols. By way of example, the present invention is applicable to any L2VPN core network technology, such as MPLS or L2TPv3, as well as to access networks that have a simple hub-and-spoke configuration of u-PEs to n-PEs, or any arbitrary topology of u-PEs, Agg-PEs, and n-PEs. The approach of the present invention also works with the RSTP protocol for any access topology.

Figure 5:
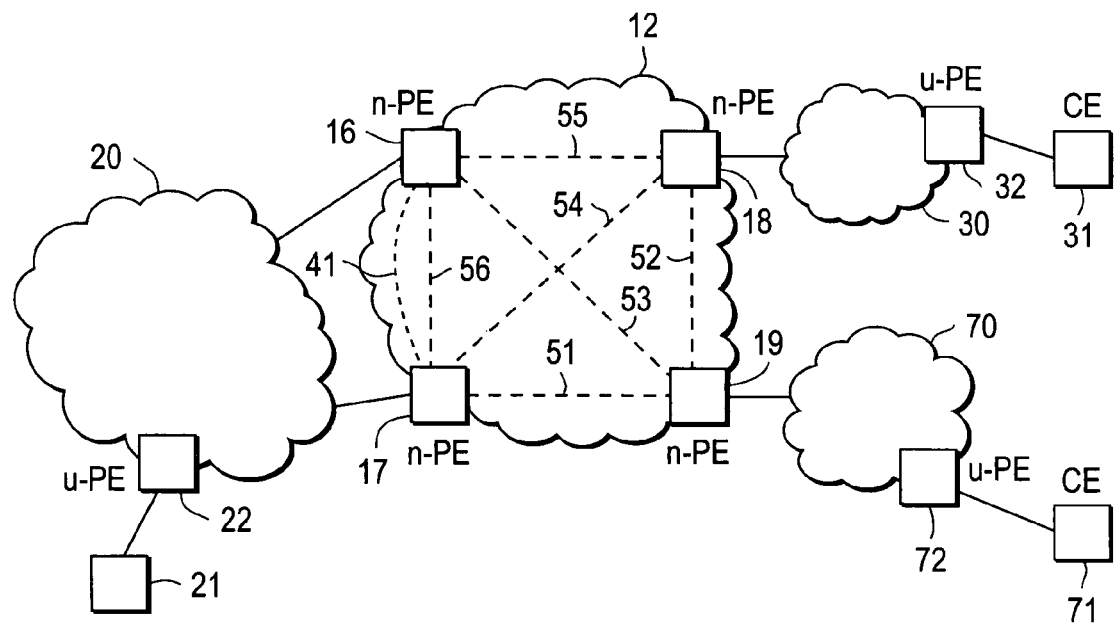
FIG. 5 is a VPLS instance according to an alternative embodiment of the present invention.

Turning now to FIG. 5, another implementation of the present invention is shown including SP core network 12 with four n-PE devices 16-19. Devices 16 & 17 act as a gateway between SP core network 12 and Ethernet access domain 20, whereas n-PE devices 18 & 19 provide core network connectivity to access domains 30 & 70, respectively. Each of the access networks 20, 30 and 70 includes respective u-PE devices 22, 32 and 72, which are used to connect respective CE devices 21, 31 and 71 to the service.

A full mesh of pseudowires comprising PWs 51-56 is shown setup between n-PE devices 16-19 for customer VPLS service in FIG. 5. An additional PW 41 is setup between n-PE devices 16 and 17. As explained previously, PW 41 is dedicated for carrying BPDU frames relayed by either n-PE device 16 or n-PE device 17. By way of further example, when n-PE device 16 receives a packet at its input interface having a multicast address that identifies it as a BPDU, it simply relays the BPDU to its output interface for transport to redundant n-PE device 17 over PW 41 only.

Figure 6:
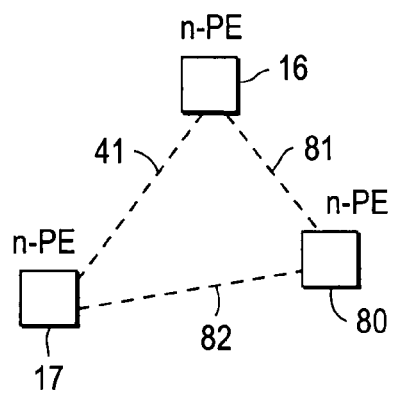
FIG. 6 illustrates a portion of a VPLS instance according to another alternative embodiment of the present invention.

In the example of FIG. 5, only one dedicated BPDU pseudowiire is needed since there are just two n-PE devices associated with Ethernet access network 20. In situations where there are more than two redundant n-PE devices associated with a single access island, a full mesh of dedicated BPDU pseudowiires is established among the redundant n-PE devices. This situation is illustrated by way of further example in FIG. 6, where a third n-PE device 80 provides further redundant connection between core network 12 and access network 20. In this case, a full mesh of PWs dedicated to BPDU traffic is setup between n-PEs 16, 17 and 80. FIG. 6 thus shows PW 41 connected between n-PE devices 16 & 17; PW 81 connecting n-PE devices 16 & 80; and PW 82 providing connection between n-PE devices 17 & 80. (Note that the other PW and elements of FIG. 5 are not shown in FIG. 5 to avoid confusion.)

Figure 7:
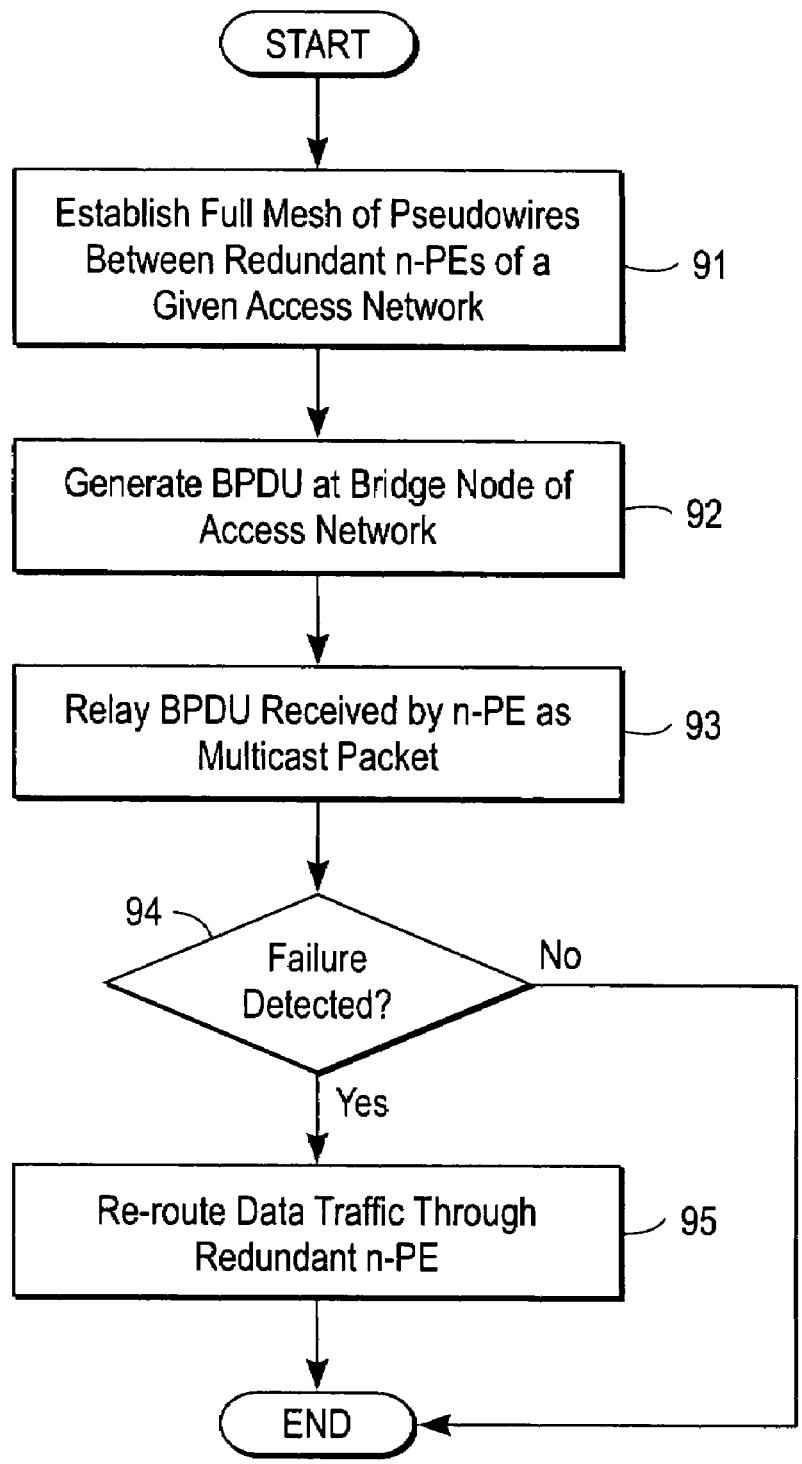
FIG. 7 is a flowchart illustrating a method of operation according to one embodiment of the present invention.

FIG. 7 is a flowchart illustrating a basic method of network operation according to one embodiment of the present invention. At block 91, a full mesh of BPDU-dedicated PWs is first established between n-PE devices associated with a given access network. These PW connections may be setup by an operator or automatically through ordinary autodiscovery and autoprovisioning processes. Next, at block 92, a BPDU is generated according to the xSTP protocol running as part of the normal functionality of each of the bridges within the Ethernet access network. When the BPDU is received by one of the n-PE devices (e.g., n-PE device 16), it is relayed across all the PWs designated specifically for BPDU traffic. This step is shown occurring at block 93. In the event that one of the n-PE devices fails, or its connection fails (decision block 94), the xSTP protocol running on the bridge nodes of the access network responds by re-routing data traffic through one of the redundant n-PE devices (block 95).

It should also be understood that elements of the present invention may also be provided as a computer program product which may include a machine-readable memory having stored thereon instructions which may be used to program a computer (or other electronic device) to perform a process. The machine-readable memory may include, but is not limited to, floppy diskettes, optical disks, CD-ROMs, and magneto-optical disks, ROMs, RAMs, EPROMs, EEPROMs, magnet or optical cards, or other type of machine-readable memory suitable for storing electronic instructions. Elements of the present invention may be downloaded as a computer program product, wherein the program may be transferred from a remote computer (e.g., a server) to a requesting computer (e.g., a customer or client) by way of data signals embodied in a carrier wave or other propagation medium via a communication link (e.g., a modem or network connection).

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A method of providing redundancy for Virtual Private Network (VPN) service with an Ethernet access network, the method comprising:
    establishing a dedicated pseudowire (PW) connection across a Layer 2 VPN (L2VPN) core network between first and second network-facing provider edge (n-PE) devices associated with the Ethernet access network, the dedicated PW being in addition to a full mesh of PWs associated with a customer Virtual Private Local Area Network service (VPLS) instance, the full mesh of PWs being used for transport of customer data packet traffic across the L2VPN core network, the dedicated PW being for provider Bridge Protocol Data Unit (BPDU) traffic only, the first and second n-PE devices not running a Spanning Tree Protocol (STP);
    receiving a BPDU at an input interface of the first n-PE device;
    relaying the BPDU on the dedicated pseudowire, by the first n-PE device, to the second n-PE device without processing the BPDU by the first n-PE device such that the first and second n-PE devices and L2VPN core network appear as a single Local Area Network (LAN) segment to aggregation devices of the Ethernet access network connected to the first and second n-PE devices.

2. The method of claim 1 wherein further comprising:
    detecting a link failure between a user-facing provider edge (u-PE) device of the Ethernet access network and the second n-PE device; and
    re-routing customer data traffic away from the second n-PE device and through the first n-PE device.

3. The method of claim 1 wherein further comprising:
    detecting a Ethernet link failure between a provider bridge (Agg-PE) device of the Ethernet access network and the second n-PE device; and
    re-routing customer data traffic away from the second n-PE device and through the first n-PE device.

4. The method of claim 1 wherein further comprising:
    detecting a node failure in a customer data traffic path that includes the second n-PE device; and
    re-routing customer data traffic away from the second n-PE device and through the first n-PE device.

5. The method of claim 1 wherein the dedicated PW comprises a VPLS instance that is separate from the customer VPLS instance.

6. The method of claim 1 wherein the L2VPN core network comprises a Multi-Protocol Label Switching (MPLS)/Internet Protocol (IP) core network.

7. The method of claim 1 wherein the first and second n-PE devices comprise non-spanning tree protocol (STP) compatible routers.

8. A method of providing Layer 2 Virtual Private Network (L2VPN) redundancy to a customer, the method comprising:
    establishing a full mesh of pseudowires (PWs) between a plurality of network-facing provider edge (n-PE) devices connected to an Ethernet access network, the PWs being used for transport of customer data packet traffic across a Multi-Protocol Label Switching (MPLS)/Internet Protocol (IP) core network dedicated for Bridge Protocol Data Unit (BPDU) traffic;
    establishing a dedicated PW between first and second redundant n-PE devices, the dedicated PW being for provider Bridge Protocol Data Unit BPDU traffic only, the first and second redundant n-PE devices not running a Spanning Tree Protocol (STP):
    generating a BPDU according to a Spanning Tree Protocol (STP) by a bridge node of the Ethernet access network;
    receiving the BPDU at an input interface of the first redundant n-PE device;
    relaying the BPDU, by the first redundant n-PE device, to a second redundant n-PE device associated with the Ethernet access network without processing the BPDU by the first redundant n-PE device.

9. The method of claim 8 wherein the first and second redundant n-PE devices and MPLS/IP core network appear as a single Local Area Network (LAN) segment to the bridge node of the Ethernet access network.

10. The method of claim 8 wherein further comprising:
    detecting an Ethernet link failure between a user-facing provider edge (u-PE) device of the Ethernet access network and the second redundant n-PE device; and
    re-routing customer data traffic away from the second redundant n-PE device and through another n-PE device.

11. The method of claim 8 wherein further comprising:
    detecting a Ethernet link failure between a provider bridge (Agg-PE) device of the Ethernet access network and a n-PE device; and
    re-routing customer data traffic away from the n-PE device and through another n-PE device having an Ethernet connection with the Agg-PE device.

12. The method of claim 8 wherein further comprising:
detecting a node failure in a customer data traffic path that includes the second redundant n-PE device; and
re-routing customer data traffic away from the second redundant n-PE device and through the first redundant n-PE device.

13. The method of claim 8 wherein the bridge node comprises an intermediate provider bridge utilized to connect a user-facing provider edge (u-PE) device with one of the plurality of n-PE devices.

14. The method of claim 8 wherein the bridge node comprises a spanning-tree protocol (STP) instance.

15. A system for providing Virtual Private Network (VPN) service to a customer comprising:
an Ethernet access network that includes a user-facing provider edge (u-PE) device connected with a customer edge (CE) device, and one or more bridges;
first and second network-facing provider edge (n-PE) devices associated with the Ethernet access network, each of the first and second n-PE devices lacking spanning-tree protocol (STP) functionality, the one or more bridges providing connectivity between the u-PE with the first and second n-PE devices;
a full mesh of pseudowires (PWs) associated with a customer Virtual Private LAN service (VPLS) instance, the full mesh of PWs being used for transport of customer data packet traffic across a L2VPN core network; and
an additional pseudowire (PW) dedicated exclusively to provider Bridge Protocol Data Unit (BPDU) traffic between the first and second n-PE devices, wherein both the first and second n-PE devices are configured to relay a BPDU received at an input interface directly to an output interface for forwarding to the other n-PE device without processing the BPDU by the first n-PE device such that the first and second n-PE devices and L2VPN core network appear as a single LAN segment to the one or more bridges of the Ethernet access network connected to the first and second n-PE devices.

16. The system of claim 15 wherein the Ethernet access network is configured with a hub-and-spoke topology.

17. The system of claim 15 wherein STP running on the one or more bridges functions in response to a node or link failure associated with the second n-PE device by re-routing customer data traffic through the first n-PE device.

18. The method of claim 15 wherein the dedicated PW comprises a VPLS instance that is separate from the customer VPLS instance.

19. The method of claim 15 wherein the L2VPN core network comprises a Multi-Protocol Label Switching (MPLS)/Internet Protocol (IP) core network.

20. A provider edge (PE) device for connection to a service provider (SP) network and an Ethernet access network comprising:
input and output interfaces;
means for relaying a Bridge Protocol Data Unit (BPDU) received from a bridge device of the Ethernet access network at the input interface directly to the output interface without processing the BPDU according to a spanning-tree protocol, the output interface being connected to a redundant PE device via a dedicated pseudowire (PW) across a Layer 2 Virtual Private Network (L2VPN) core network, the dedicated PW being in addition to a full mesh of PWs associated with a customer Virtual Private Local Area Network service (VPLS) instance, the full mesh of PWs being used for transport of customer data packet traffic across the L2VPN core network, the dedicated PW being for provider BPDU traffic only, both the PE device and the redundant PE device not running a Spanning Tree Protocol (STP), the PE device, the redundant PE device, and the L2VPN core network appearing as a single Local Area Network (LAN) segment to the bridge device.

21. The PE device of claim 20 wherein the PE device comprises a router.

22. The PE device of claim 20 further comprises a dedicated Virtual Switch Instance (VSI) for BPDU traffic.

23. A computer readable memory encoded with a computer program product for configuring a network-facing provider edge (n-PE) device that lacks spanning tree protocol functionality, when executed the computer program product being operable to:
relay a Bridge Protocol Data Unit (BPDU) received from a bridge device of an Ethernet access network at an input interface of the n-PE directly to the output interface of the n-PE without processing of the BPDU; and
forward the BPDU to a second n-PE device on a dedicated pseudowire (PW) connected to the output interface, the dedicated PW being connected to the second n-PE device across a Multi-Protocol Label Switching (MPLS)/Internet Protocol (IP) core network, the dedicated PW being in addition to a full mesh of PWs associated with a customer Virtual Private Local Area Network service (VPLS) instance, the full mesh of PWs being used for transport of customer data packet traffic across the L2VPN core network, the dedicated PW being for provider BPDU traffic only, the n-PE device, the second n-PE, and the MPLS/IP core network appearing as a single Local Area Network (LAN) segment to the bridge device.

* * * * *